United States Patent [19]

Speakman

[11] 3,951,561
[45] Apr. 20, 1976

[54] STRESS COINING TOOL FASTENED JOINT
[75] Inventor: Eugene R. Speakman, Fullerton, Calif.
[73] Assignee: McDonnell Douglas Corporation, Long Beach, Calif.
[22] Filed: Dec. 10, 1973
[21] Appl. No.: 423,411

Related U.S. Application Data
[63] Continuation of Ser. No. 221,763, Jan. 28, 1972, abandoned, which is a continuation of Ser. No. 25,288, April 29, 1970, which is a continuation of Ser. No. 779,148, Nov. 26, 1968.

[52] U.S. Cl. .............................. 403/279; 403/388; 52/758 F; 85/7
[51] Int. Cl.² ...................... F16B 7/10; B25G 3/00; F16D 1/00
[58] Field of Search .................. 151/41.73; 85/9, 1, 85/7.5, 46; 29/90, 567; 287/189.36 F, 189.36; 72/377; 403/279, 280, 388; 52/758 F

[56] References Cited
UNITED STATES PATENTS
1,425,122  8/1922  McKechnie et al. .............. 29/95.1
2,008,229  7/1935  Sharp .............................. 85/1
2,972,274  2/1961  Bombard et al. ................. 85/1
3,578,367  5/1971  Harvill .......................... 52/758 F
3,779,127  12/1973  Speakman ...................... 85/7

Primary Examiner—Dave W. Arola
Assistant Examiner—Wayne L. Shedd
Attorney, Agent, or Firm—G. W. Finch; W. J. Jason; D. L. Royer

[57] ABSTRACT

A stress coining fastened joint, for minimizing stress concentration in a wall of an aperture in a metallic structural member, the tool being a rigid elongated shaft adapted for forcible insertion through the aperture. The shaft has end portions and is provided with a plurality of different diameter, annular protuberances spaced intermediate the end portions. The largest of the protuberances has a diameter of such predetermined relationship to the diameter of the aperture, that upon a forced insertion thereof through the aperture the material forming the wall of the aperture is displaced radially substantially the difference between the diameter of the largest protuberance and the diameter of the aperture. The displaced material will thereafter rebound approximately one-half of the initial displacement. The stress coining tool may be combined with a conventional fastener to provide a simultaneous stress coining and fastening operation.

4 Claims, 7 Drawing Figures

U.S. Patent   April 20, 1976   3,951,561
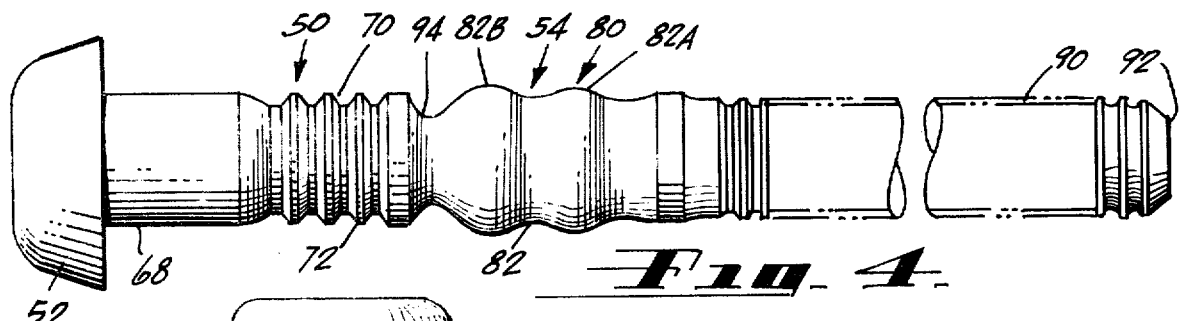
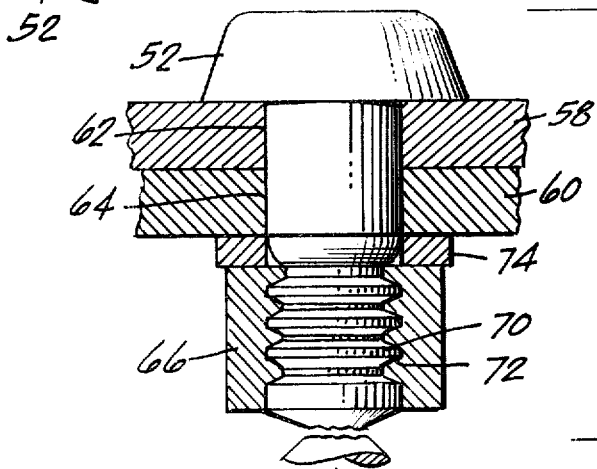
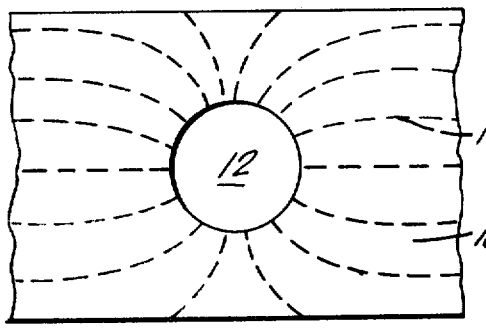
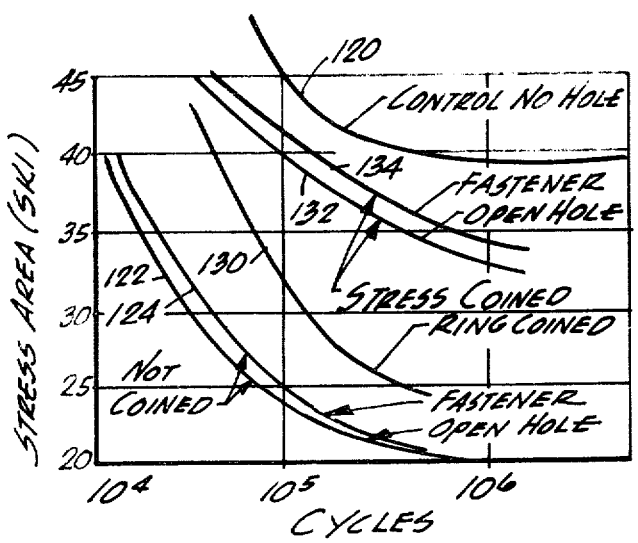
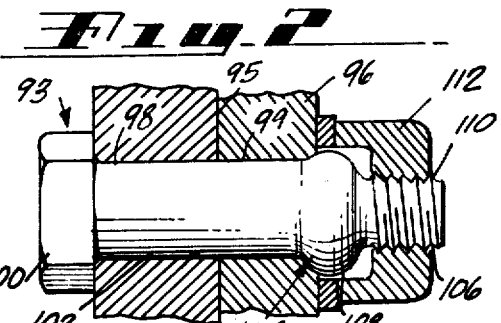
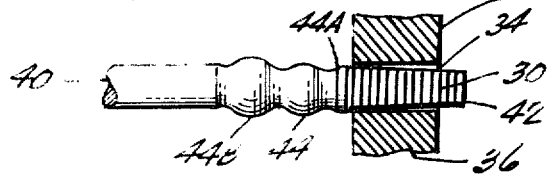
INVENTOR.
EUGENE R. SPEAKMAN
BY
Ming Y. May

3,951,561

STRESS COINING TOOL FASTENED JOINT

RELATED APPLICATIONS

This is a continuation of copending patent application Ser. No. 221,763, filed Jan. 28, 1972, which is now abandoned, which in turn is a continuation of copending patent application Ser. No. 25,288, filed Apr. 29, 1970, which is a continuation of copending patent application Ser. No. 779,148 for Stress Coining Tool, filed Nov. 26, 1968 by Eugene R. Speakman.

BACKGROUND OF THE INVENTION

In many types of structural members it is a requirement to know what force can be applied to the member before the member will fail or "yield". Such "yield" point can be easily calculated when the members are under static load conditions; however, when a member is constantly subject to a fluctuating movement where the fluctuations establish some sort of a definite pattern a different kind of failure is applicable, such being defined as a fatigue failure. A fatigue failure is usually a gradual or progressive fracture. The fracture starts at some point in the structural member at which the stress is much larger than anticipated. This high localized stress causes a small crack which gradually separates as the flexing movement is repeated until the entire member ruptures without measurable yielding. It is well known in this type of failure that the inclusion of an aperture therein, such as a drilled hole for the insertion of a fastening member, creates an area for the derivation of a high localized stress. It is desirable to modify the aperture in some manner whereby the high localized stress can be either substantially reduced or eliminated.

In aircraft, during flight, the wing structures and the fuselage structural members are subjected constantly to this type of fatigue failure. The wind turbulence, coupled with the aircraft maneuvers, cause a cyclic movement of practically all the structural supporting members within the aircraft. As such members usually contain apertures therein for the insertion of fastening means, the high localized stress created thereby greatly compounds the fatigue failure problem.

A method to increase the fatigue and endurance limit of structural members is described in U.S. Pat. No. 3,110,086. The method disclosed comprises the forming of a thin groove spaced from and around an aperture in the structural member. Although this method has been of great advantage for the past number of years, such still does not solve the problem of decreasing the high localized stress, but merely creates a compressive stress which functions as a fence around the area of the localized stress.

Another method to increase the fatigue and endurance limit of structural members is described in U.S. Pat. No. 3,434,327, filed Nov. 1, 1966 by the Applicant, for Stress Coining, which was copending with the original patent application of this continuation. The application of this method results in metallic material in the vicinity of the aperture, or area of high localized stress, to be compressed to such a point as to cause the material to exceed the elastic limit and become plastic. The force required to accomplish such must be substantial to cause sufficient material displacement and deformation within the plastic range of the material. Upon release of the force the material will rebound back into the elastic range with the result that a residual, compressive, congenital stress is obtained in the area of the aperture which tends to counteract any stress which might cause failure of the structural member. The effect of the applied force also causes the elimination of any surface cracks or other breaks in the material due to the drilling or other forming operation of the aperture. Also, any undesirable tensile stresses are substantially reduced or eliminated. This method is known as the Stress Coining Method.

The material displacement to effect the operation of the method disclosed in the above-identified copending application must be within a certain range in order to accomplish the desired results. The material displacement, if not sufficient, would not cause the elimination of the surface stresses and also would not create sufficient residual compressive stress. If the material displacement is too great the rebound of the material will be slight in proportion to the material displacement; therefore, not creating the maximum value of residual compressive stress in a wall of the aperture. It has been found through experimentation that a rebound of approximately one-half the value of the initial material displacement is satisfactory. The stress coining tool of the present invention accomplishes the above objectives with great assurance.

There have been other attempts to solve the problem of fatigue failure. It is known that the mere inclusion of a screw slightly increases the fatigue endurance limit of a structural member having an aperture therein. The inclusion of a lockbolt or rivet slightly improves the fatigue characteristic over the application of a screw. However, still greater advances could be achieved in the area of fatique failure.

Conventional screws and bolts include various types of configurations for accomplishing various results with respect to an adjacent wall portion such as sealing, sizing, broaching, burnishing, etc.; however, no prior fasteners have the capability of stress coining or cold-working the wall material of the aperture to accurately size the aperture, to eliminate surface cracks and undesirable tensile stress, and also to create residual compressive stress to counteract fatigue tensile stresses which tend to cause premature failure of the structural member.

Since the inclusion of an aperture in a structural member is usually for the insertion of a fastening member, it is a direct improvement on the state-of-the-art to provide a fastener with the features of the aforementioned stress coining tool which is capable of stress coining the aperture when the fastener is installed. Such a fastener eliminates the additional work of stress coining the aperture itself as a separate operation. Thus, in one operation the desired modification to the aperture can be made whereby the high localized stress can be either substantially reduced or eliminated. The fasteners of the present invention accomplish the above objectives with great assurance.

SUMMARY OF THE INVENTION

In carrying out the principles of this invention according to one embodiment thereof, there is provided a stress coining tool for increasing the fatigue strength of a metallic structural member having an aperture therein. The stress coining tool comprises a substantially rigid elongate article having end portions, and at least one annular protuberance located intermediate the end portions. The largest annular protuberance has a diameter of such a relationship to the diameter of the aperture that upon a forced insertion thereof through the aperture, the material forming the wall of the aperture is displaced radially substantially the difference between the diameter of the largest annular protuberance and the diameter of the aperture, and the displaced material is thereafter allowed to rebound approximately one-half of the initial material displacement. Incorporation of this stress coining tool into a fastener design provides a fastener component for establishing a controlled interference fit in aligned apertures in structural members to be united. Such a fastener is capable of stress coining the aperture when the fastener is installed, thus eliminating stress coining of the aperture as a separate operation.

BRIEF DESCRIPTION OF THE DRAWINGS

FIG. 1 is a diagrammatic representation of a stress pattern in an apertured structural member showing lines of stress therein prior to coining by the apparatus of this invention;

FIG. 2 is a view similar to FIG. 1 showing the stress pattern in the member following a coining operation by the apparatus of this invention;

FIG. 3 is a side elevational view showing one embodiment of the present invention;

FIG. 4 is an enlarged fragmentary elevational view of a second embodiment of the present invention;

FIG. 5 is an elevational view, partly in section, showing a pair of structural members united by the article shown in FIG. 4, the article being shown fragmentarily with the tensioning or anchoring components in place and the nonfastening portion broken away;

FIG. 6 is an elevational view, partly in section, of a pair of structural members united by a third embodiment of the present invention; and FIG. 7 is a fatigue stress diagram depicting graphically the improvement obtained by the use of the articles shown in FIGS. 3, 4 and 6.

DESCRIPTION OF THE SHOWN EMBODIMENTS

In FIG. 1 a structural member 10 is shown having an aperature 12 formed therein. The aperture 12 can be formed by any one of the many conventional ways as by drilling or reaming. Lines 14 represent the stress pattern of the member 10 in conjunction with the aperture 12. It is clearly shown that the lines of stress 14 tend to converge toward the center of the aperture 12; therefore, as tensile stress is applied to structural member 10 the magnitude of the force will be concentrated upon the aperture 12. In other words, the weakest portion of the member 10 is in the area of aperture 12.

In FIG. 2 is a stress diagram similar to FIG. 1 in which a structural member 16 is shown having an aperture 18. Aperture 18 has been stress coined by the apparatus of this invention. Stress lines 20 depict the stress pattern of the member 16 showing the effect of the stress coining of this invention as compared to FIG. 1. It is shown that the lines of stress 20 do not converge on the aperture 18, as in FIG. 1, and tend to flow around the aperture similar to an aerodynamic flow pattern. As the lines of stress are not concentrated at any single point, there is no "weakest link" and the structural member 16 functions substantially as a nonapertured member.

In FIG. 3 there is depicted an embodiment of the invention in which a stress coining tool 30 for minimizing stress concentration in a wall 32 of an aperture 34 formed in a metallic structural member 36 is shown. The stress coining tool 30 is a substantially rigid, elongate article made of a suitable steel alloy or other metal harder than the material of the strucutral member 36. The stress coining tool 30 has end portions 40 and 42, and a plurality of olive-shaped annular protuberances 44 positioned intermediate the end portions. The end portion 42 has a diameter slightly smaller than the diameter of the aperture 34 so that the tool 30 can be easily inserted therein. The size and shape of the annular protuberances 44 are important characteristics of the invention since not only do they provide the means to stress coin the aperture 34, but in combination the assure that the tool 30 follows the proper straight path through the aperture 34. The initial protuberance section 44A is usually slightly larger than the diameter of the aperture 34. The annular protuberances are progressively enlarged diametrically in relatively small increments of about .002 inch from the initial protuberance 44A toward the final protuberance 44B. The final protuberance 44B has a diameter of such predetermined relationship to the diameter of the aperture 34, that upon a forced insertion of the tool 30 through the aperture, the material forming the wall 32 of the aperture 34 is displaced radially an amount equalling substantially the difference between the diameter of the final annular protuberance 44B and the diameter of aperture 34, and thereafter, the displaced material rebounds approximately one-half of the initial material displacement. It is therefore obvious that the material forming the wall 32 is deformed plastically an amount that about equals its elastic deformation as the protuberances 44 are forced therethrough.

It has been found experimentally that the driving force that is required to forcibly insert the stress coining tool 30 through the aperture 34 should in some cases be continuous until the final annular protuberance 44B of the tool 30 has been driven through the aperture. Such a driving force can be supplied by a rivet gun manufactured by The Chicago Pneumatic Tool Company of New York, or a hydraulic press manufactured by Verson Press Company of Illinois. Both the rivet gun and the hydraulic press are well known in the art and form no part of the present invention.

The stress coining tool 30 must have a fine, highly polished finish if optimum fatigue life improvement of the structural member 36 is to be obtained. The material about the periphery of the wall 32 of the aperture 34 must be only cold-worked, and it is necessary to eliminate the expansion of the material due to frictional heat energy. The heat energy, if not eliminated, will reduce or substantially eliminate the residual, compressive stress which is to remain in the material after the stress coining operation. To reduce friction, the stress coining tool 30 may be heavily lubricated and the reduced diameter areas adjacent the protuberances 44 form reservoirs for such lubricant. As the protuberances 44 pass through the aperture 34, the aperture wall 32 elastically recovers into the reduced diameter areas between the protuberances 44 to pick up the lubricant. These reservoirs, therefore, assure that there is proper lubrication between aperture wall 32 and the protuberances 44 even when the aperture 34 is relatively deep. Better or more consistent lubrication also results in some instances by using a rivet gun to drive the tool 30 through the aperture 34. It is believed that in this later case, the vibratory nature of the rivet gun assists in uniformally distributing the lubricant. Suitable lubricant may be, for example, lubricant oil FarBest 472, manufactured by the FarBest Chemical Company of Los Angeles, California.

To obtain optimum fatigue life improvement and the required final aperture size, the correlation of the prestress-coined aperture size to the size of the largest annular protuberance 44B of the stress coining tool 30 must be maintained. As stated previously, approximately one-half of the interference between the undersized prestress-coined aperture 34 and the largest protuberance 44B of the stress coining tool 30 should be allowed to spring back to form the final aperture. The following correlations of the diameters of the prestress-coined aperture, the largest annular protuberance, and the stress-coined aperture have been experimentally found to be satisfactory.

| STRESS-COINED APERTURE DIAMETER (INCH) | PRESTRESS-COINED APERTURE DIAMETER (INCH) | LARGEST PROTUBERANCE DIAMETER (INCH) |
|---|---|---|
| .1860–.1880 | .1830–.1850 | .1890 |
| .3080–.3105 | .3065–.3085 | .3125 |
| .6245–.6265 | .6210–.6230 | .6290 |

Shown in FIGS. 4 and 5 is a fastener component 50 which comprises a head 52 and a stem group 54 immediately adjacent and integral with the head 52. The fastener component is formed of a suitable steel alloy or a material which is harder than the material of structural members 58 and 60, illustrated as being secured by the fastener component 50. The structural members 58 and 60 have preformed openings or apertures 62 and 64 through which the stem group 54 of the fastener 50 is to be forced to secure the structural members 58 and 60 in an abutting relationship. The stem group 54 is an elongated article adapted to be tensioned and anchored by an anchoring member 66 such as a nut or a collar. The stem group 54 of the fastener component 50 includes a shank 68 integral with and adjacent the head 52. The shank 68 is a cylindric section sized for controlled interference or looseness fit with the walls of the apertures 62 and 64.

The stem group 54 also includes a fastener receiving portion 70 which comprises a set of helical screw threads 72 disposed longitudinally adjacent the cylindric shank 68. These threads may be of any desired or suitable variety such as Vee, U.S. Standard, or the like, and are adapted to interengage with the anchoring or abutment establishing means 66 which may be in the form of a nut or swaged aluminum collar correspondingly threaded so as to anchor the installed fastener component 50 in a manner shown in FIG. 5. The employment of a washer 74 being preferable for use in conjunction with structural members 58 and 60.

The stem group 54 further includes stress coining means 80 which is integral with and adjacent the fastener receiving portion 70. The stress coining means 80 comprise a plurality of separate longitudinally spaced olive-shaped annular protuberances 82. The initial protuberance 82A is usually slightly larger than the diameter of the apertures 62 and 64, with the annular protuberances 82 progressively enlarging diametrically in increments of about 0.002 inch from the protuberance 82A toward the head 52 to the largest protuberance 82B. The progressive enlargement of the protuberances 82 improves their cold-working characteristics and assures that the fastener 50 follows the desired straight path through the apertures 62 and 64. It has been found that in relatively deep apertures, fasteners with only one stress coining protuberance 82 tend to buckle, hunt or "ball and socket" from side to side as they are being driven through the apertures 62 and 64. This buckling causes undesirable variations in the amount of stress coining and in the extreme case cause the fastener 50 to bind up and break in the aperture, thereby ruining the structural members 58 and 60.

The stress coining means 80, when forcibly inserted through apertures 62 and 64 of structural members 58 and 60, respectively, cause the material around the apertures 62 and 64 to displace radially substantially the interference between the apertures and the largest annular protuberance 82B, and thereafter, the displaced material is allowed to rebound approximately one-half of the initial material displacement. An important characteristic of the stress coining operation is the amount of cold-working which is accomplished upon the material around the apertures 62 and 64. If the apertures are enlarged excessively, the apertures will be damaged to where the fatigue strength thereof is not increased but is lessened. If the apertures are not enlarged enough, maximum fatigue stress capabilities are not achieved. It has been discovered that if the aperture is enlarged sufficiently so that the rebound is approximately equal to one-half of the aperture enlargement, maximum fatigue strength capabilities are achieved.

To obtain optimum fatigue life improvement of the structural members 58 and 60, the stress coining means 80 must have a highly polished finish and be heavily lubricated in order to avoid friction. The relationship between the diameter of the largest protuberance 82B and the diameters of the prestress-coined apertures must be maintained, as discussed in connection with the embodiment shown in FIG. 3.

Experiments with the fastener 50 have shown that the fatigue strength of the structural members 58 and 60 to be united is dependent upon the degree of interference fit between the shank 68 and the aligned, preformed apertures 62 and 64. Experimental data indicates that the fatigue strength increases as the degree of interference fit increases, and when the interference exceeds a certain limit, the fatigue life of the structural member begins to decrease. This is due to the fact that high interference between the apertures 62 and 64 and the shank 68 creates a high sustained tensile stress that causes stress corrosion cracking inside the apertures. Further, when the interference is substantial, installation of the fastener becomes a major problem, especially when the structural members to be united are relatively thick.

Depending upon the nature of the matching of the cylindric shank 68 and the walls of the apertures 62 and 64, the largest annular protuberance 82B may, coupled with the recovery or spring-back of the aperture walls, have a diameter of such predetermined relationship to the diameter of the cylindric shank 68 so as to provide the interference fit required. The cylindric shank 68 and the stress coining or aperture-sizing means 80 are formed about one and the same longitudinal axis so to be concentric.

In addition to increasing the fatigue strength of the structural members 58 and 60 to be united by stress coining the apertures 62 and 64, and by establishing a controlled interference fit between the shank 68 and the apertures 62 and 64, the fastener component 50 offers an additional advantage of accomplishing the desired result in one operation resulting in substantial cost savings.

The stem group 54 further includes optional engaging means 90 and a free end 92. The engaging means 90 lie longitudinally adjacent to the stress coining means 80 and are most distant from the head 52. The engaging means 90 provide surfaces or grip formations which are adapted to interengage with a pull-through instrumentality. This instrumentality, as is well known, comprises means for exerting a longitudinally directed pull or tension on the stem group 54 of the fastener component 50. Such an instrumentality can be a so-called Huck gun (not shown), made and distributed by the Huck Manufacturing Company of Detroit, Michigan, or a so-called hand puller, or any other suitable type of mechanical puller.

The stem group 54 may also include a breakneck portion 94 which constitutes means for detachably or frangibly joining or integrating the shank 68 and the fastener receiving portion 70 to the other sections of the stem group 54. The breakneck section 94 is a portion of the stem group between the fastener receiving portion 70 and the stress coining means 80 being formed with a reduced diameter. The breakneck section 94 is the portion of minimum tensile strength of the stem group 54, and may be broken by application of substantial force when the shank 68 has been seated in the stress-coined apertures.

In FIG. 6 there is shown a fastener component 93 for improving the fatigue strength of structural members 95 and 96, and for establishing a controlled interference fit in aligned preformed apertures 98 and 99. The fastener component 93 is a substantially rigid, elongated article made of a material harder than the material of the structural members 95 and 96. The fastener component 93 includes a head 100, a cylindrical shank 102 integral with and adjacent the head 100, stress coining means 104 adjacent the shank 102, and a fastener receiving portion 106 adjacent the stress coining means 104.

The stress coining means 104 include at least one annular protuberance 108 having a diameter greater than the diameters of the apertures 98 and 99. The relationship between the diameter of protuberance 108 and the diameters of apertures 98 and 99 is such that upon a forced insertion of the protuberance 108, the material forming the wall of the apertures 98 and 99 is displaced radially substantially the difference between the diameter of the protuberance 108 and the diameters of the apertures, and thereafter, the displaced material is allowed to rebound approximately one-half of the initial material displacement. Additionally, the relationship of the diameters of the protuberance 108, the apertures 98 and 99, and the shank 102 may be chosen to provide the desired interference fit between the shank 102 and the apertures 98 and 99.

To obtain optimum fatigue life improvement of the structural members 95 and 96, the stress coining means 104 must have a highly polished finish and be heavily lubricated to avoid friction. Since the stress coining means 104 will remain with the fastener and will not be separated from the shank after installation, this fastener design provides the advantage that it is reusable.

The fastener receiving portion 106 includes threads 110 adapted to interengage a collar or nut 112 correspondingly threaded so as to anchor the installed fastener component 93 in a manner shown in FIG. 6. Additionally, a sleeve member (not shown) may be provided to protect threads 110 prior to installation, and to guide the fastener component during driving installation. The sleeve member is adapted to interengage threads 110 and serves as a protective housing for the fastener receiving portion 106 prior to installation. Since the diameter of the sleeve member is only slightly smaller than the diameters of the aligned apertures 98 and 99, it serves as a guide for the fastener component 93 during driving installation. After insertion of the fastener component 93 through the apertures 98 and 99, the sleeve is removed to allow engagement of the anchoring means 112.

In FIG. 7 there is shown a fatigue stress diagram of a structural member which has beeen operated on by the apparatus of this invention as compared to previously known methods. The vertical coordinate shows the force per unit area applied to the structural member, and the horizontal coordinate represents the number of cyclic fluctuations before failure of the structural member. Line 120 represents the fatigue characteristics of the structural member without the forming of an aperture therein. Line 122 represents the material specimen in which an unaffected aperture is found therein; therefore, line 122 represents the worst situation as to fatigue failure, line 124 shows the effect of the inclusion of fasteners such as screws, lockbolts and rivets. It is noted that inclusion of a fastener provides a slight improvement as to fatigue failure. The effect of ring coining is shown as line 130 which is a substantial improvement over the fastening means as shown in line 124. The effect of stress coining is shown as line 132, a substantial improvement over the ring coining of line 130 being readily apparent. The effect of the inclusion of the fastener of the present invention which includes stress coining provisions is shown as line 134; therefore, this invention causes the apertured structural member to approach the nearest to fatigue characteristics of the nonapertured member depicted as line 120, such being the maximum.

Thus there has been shown and described novel stress coining tools which fulfill all the objects and advantages sought therefor. Many changes, alterations, modifications, and other uses and applications of the tools will become apparent to those skilled in the art after considering this specification and the accompanying drawings. All such changes, alterations and modifications which do not depart from the spirit and scope of the invention are deemed to be covered by the invention which is limited only by the claims which follow.

What is claimed is:

1. A structural joint comprising:
 a workpiece having a pair of exposed opposite surfaces formed by a plurality of overlapping contiguous metal elements in face-to-face contacting relation with the next adjacent element; the metal forming the elements having the inherent physical property of being receptive to improvement in its fatigue strength via coldworking and elastically rebounding to a different size and an increased fatigue strength after such cold working;
 a straight bore of a first selected diameter extending coaxially through all of said elements; and
 a unitary metallic combined headed bolt and metalworking tool formed coaxially on a shank common to both, the bolt portion and the tool portion being joined by a breakneck groove which groove provides means for eventual frangible removal of said tool portion,
 the bolt portion comprising:

a head;

a cylindrical shank having a second predetermined diameter larger than said workpiece bore one end of which is joined to said head and an alternately ridged and grooved fastener-receiving portion having a diameter less than said bore extending from the other end of the cylindrical shank and terminating adjacent said breakneck groove, said cylindrical shank extending substantially through said workpiece bore and being engaged by the walls of said bore with an interference fit, said head engaging one of said surfaces adjacent the bore; and a fastening collar surrounding and tightly interengaged with said fastener-receiving ridges and grooves, said fastening collar having end faces one of which firmly engages with the other surface of said workpiece, the remaining face of said collar terminating adjacent said breakneck groove, said tool portion comprising:

a metalworking section adjacent said breakneck groove, said metalworking section including a cylindrical shank having a diameter less than said workpiece bore along which a plurality of axially-spaced, smooth-surfaced, solid, annular, relatively hard protuberances extend radially therefrom to form hole-expanders, said expanders having successively graduated selected maximum diameters each of which is larger than the diameter of said workpiece bore with the expander of largest diameter being adjacent said breakneck groove, each expander being formed by a smoothly curved surface of revolution the maximum diameter of which is in the middle thereof, said curved surface having an initial segment facing toward said end portion and a return segment facing toward said breakneck groove, both the initial and return segments of the curved surface extending from said maximum diameter with progressively smaller diameters and generally asymptotically approach said tool shank diameter, the space between successive expanders forming recesses for a lubricant and the diameter of the largest expander section being larger than said workpiece bore by an amount substantially equal to twice said elastic rebound of said workpeice bore wall, said cylindrical shank having a diameter greater than the diameter to which the bore tends to rebound after coldworking and less than the diameter of said expander; and a tool-receiving end portion extending from the smallest of the expanders a distance sufficient for engagement by a tool and including ridge and groove means for co-operation therewith, whereby said bore has been cold worked by said expanders during insertion of said combined bolt and tool, the fatigue strength of the walls of the bore through said workpieces has been increased and thus engages said bolt shank with a stronger and more fatigue-resistant grip and thereby forming an improved structural joint.

2. A structural joint according to claim 1 in which said fastener receiving portion includes a threaded portion to form the alternate ridges and grooves thereof, said fastening collar having a threaded portion which engages therewith.

3. A structural joint according to claim 1 in which each hole expander has a longitudinal cross-section shape which is a continuous convex arc.

4. The structural joint defined in claim 1 wherein said hole explanders are sized to the metal from which said workpiece is comprised and to the size of said bore so that said bore is elastically and plastically deformed in such a manner as to cause said bore diameter to rebound from said deformation an amount which is about one half the total deformation since this results in the greatest fatigue strength improvement.

* * * * *